H. O. RUGH.
MIRROR DEVICE.
APPLICATION FILED AUG. 21, 1919.
1,347,593.
Patented July 27, 1920.
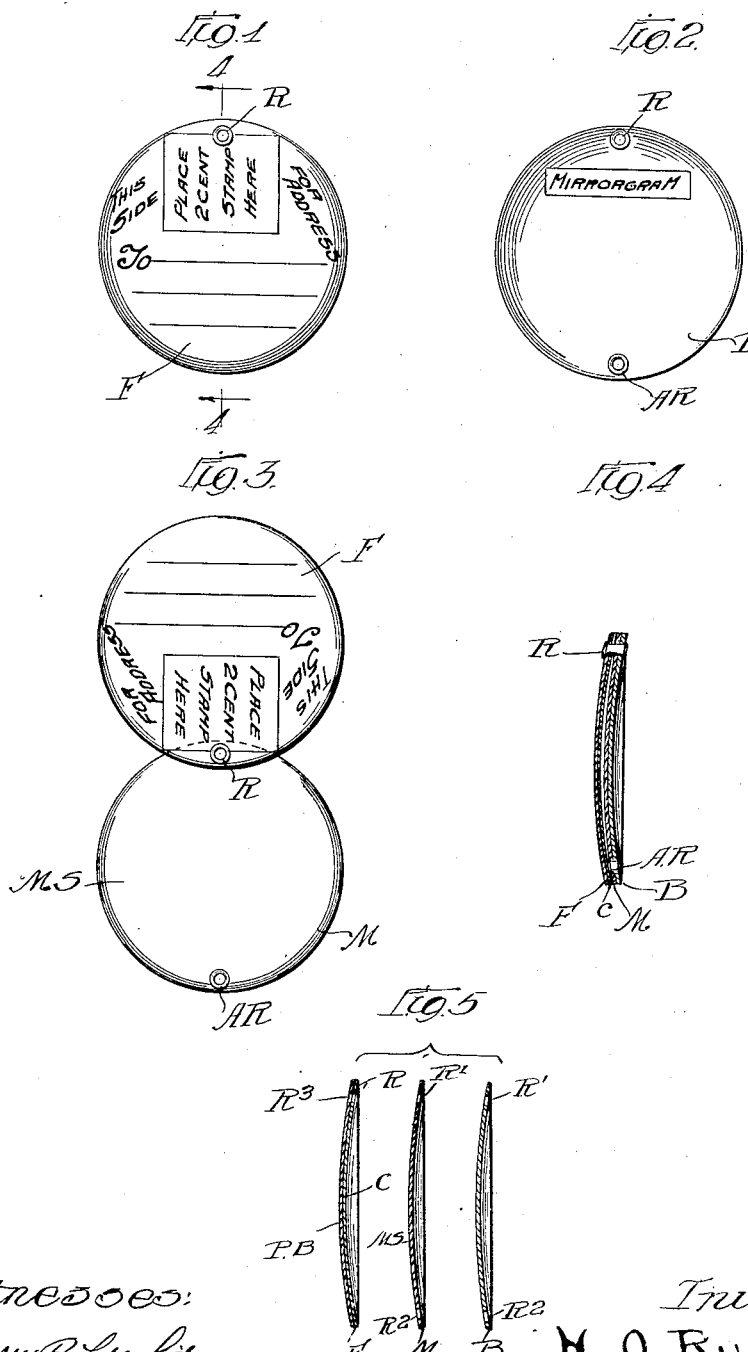

UNITED STATES PATENT OFFICE.

HARRY O. RUGH, OF CHICAGO, ILLINOIS.

MIRROR DEVICE.

1,347,593.  Specification of Letters Patent.  Patented July 27, 1920.

Application filed August 21, 1919. Serial No. 318,865.

*To all whom it may concern:*

Be it known that I, HARRY O. RUGH, a citizen of the United States, and a resident of Chicago, in the county of Cook and State of Illinois, have invented certain new and useful Improvements in Mirror Devices, of which the following is a full, clear, concise, and exact description, reference being had to the accompanying drawings, forming a part of this specification.

My invention relates to certain improvements in mirror devices, and more particularly to such mirror devices, as may be conveniently carried by the user and which may be carried by the user without being subject to breakage.

It is a principal object of my invention to provide a novel and improved device of this general character, wherein the mirror comprises a metal sheet having a highly polished mirror surface and in which the polished surface is protected from damage when not in use. It is another object of my invention to provide cover members for the said metallic sheet to protect the same, or when the mirror device is used as a postcard and sent through the mails to protect other mail matter from the edges of the said metal sheet.

I also so stamp out the mirror and cover members in disk form, that they may be slightly bowed, or dished to have an outer convex surface; when rotatably connected together near one edge of the disk members, as will be later described, by means of this convex surface, the different disk units comprising the mirror device, are normally centered and by virtue of the friction between them tend to remain in normal, mirror closing position. It is a further object of my invention, therefore, to provide a structure having this advantage, and also, at the same time, to thereby secure a convex mirror surface which has the additional virtue of reflecting to the eyes of the user, an image large enough to show all of the user's features; that is, I provide a mirror surface of small area which may reflect an image of the entire face of the user, even when the mirror is placed closely thereto.

It is a further object of my invention to provide in such a mirror device a mirror surface protecting cover, which normally rests against the said mirror only at the edges thereof, this, by virtue of providing greater dishing of the mirror cover as compared with the dishing of the mirror disk.

Another object of my invention is, to prevent relative displacement of the mirror member proper and the back cover of the mirror and to provide for the front cover of the mirror an inner coating of soft non-abrasive material.

A further object of my invention is to provide outer surfaces on front and back mirror covers, for the inscribing of a message such as an advertising message, or, when the device is used as a postcard, for the placing of a stamp, name and address on one of the covers, and for the placing of a message to the intended recipient on the other mirror cover.

Other objects of my invention, and the invention itself will be better understood from the description thereof which follows, and in which description reference will be had to the accompanying figures illustrating a preferred embodiment of my invention.

Figure 1, illustrates a front view of the mirror device of my invention, in normal closed condition. In this view the front cover and an eyelet to secure the mirror members together alone are shown.

Fig. 2, shows a rear view of the mirror device in normal closed condition, the other end of the said eyelet being shown in this figure together with an additional lower eyelet which, coöperating with the first eyelet, non-rotatably holds the back cover member and the mirror member together.

Fig. 3, shows a front view of the mirror device in operative or opened condition, wherein the front cover is rotated about the securing eyelet as an axis to expose the polished mirror.

Fig. 4, shows a side cross-sectional view of the mirror device in normal closed position.

Fig. 5, shows a side cross-sectional view of the three main disk members.

Referring now particularly to Fig. 5, at M, I show a slightly bowed or dished metallic disk member having an outer convex mirror surface MS, and which metallic disk is stamped from a thin sheet of metal, one surface of which has previously been coated with a metallic coat of high luster and which coated reflecting surface is of high power. The mirror disks are stamped from this coated sheet of metal in such a way that the mirror disk becomes dished, the polished surface of high luster, being the convex surface of the disk. Preferably at the same time this disk is stamped out it is perforated to form the rivet holes R¹ and R². The back cover member B is formed in like manner being preferably stamped from a press-board sheet and dished in the same manner and having the same degree of convexity as the mirror member M. The front cover F is preferably stamped, from a sheet of coated press-board, outer press-board portion being shown at PB, and the inner coat portion being shown at C; the press-board sheet is coated before the stamping of the disks so that the member F comprising the coated press-board is stamped out as a single unitary disk. The coating may consist of a paper having a very soft texture, or it may be of some kind of soft cloth. This front member is preferably dished to a greater degree than the intermediate mirror, or the back cover member, and is perforated at R³.

When the device of my invention is assembled the members F, M, and B are securely fastened together by a rivet R as shown in the assemblage drawings of Figs. 1 to 4 inclusive. This rivet R passes through perforation, R³, of the member F, and perforations R′, of the members M and B respectively.

Also as illustrated in Figs. 2, 3 and 4, a second rivet AR is employed to securely hold together the members M and B, so that the members M and B are non-rotatably secured together with respect to each other by means of the rivets R and AR. The disk member F, comprising the front cover of the mirror device, however, is rotatably secured by means of the rivet member R to the other disk members M and B. The user of the mirror device is thus enabled to rotate the cover member F upon the eyelet axis R so as to expose the mirror surface MS to view.

Figs. 1, 2, and 3 show typical inscriptions adapted to be placed on the cover members F and B by the manufacturer thereof. It is obvious that a purchaser by placing the intended recipient's name and address on spaces provided therefor, on the cover member F, and adding a postage stamp in the provided space, may send the mirror device through the mails, to the recipient, to convey a message to the said recipient, which message may be inscribed on the back cover member B under the inscription, "Mirrorgram" shown thereon in Fig. 2.

I preferably make the metallic intermediate disk of slightly less diameter than the other disks in order to enable the outer disk edges to protect other mail matter from possible injury by the relatively sharp edges of the metallic disk.

Having thus described my invention I wish it to be understood that while I have illustrated and described a specific embodiment thereof for the purpose of explaining my invention, I am aware that numerous and extensive departures may be made from the embodiment illustrated and described without departing from the spirit of my invention, but what I claim as my invention, is defined in the following claims:

1. In a mirror device, the combination with a dished mirror disk having a convex reflecting surface, of a protecting disk cover for the said reflecting surface having an inner concave surface, the degree of concavity of the said cover inner surface being greater than the degree of convexity of the said convex mirror surface.

2. In a mirror device, the combination with a dished mirror disk having a convex reflecting surface, of a protecting disk cover for the said reflecting surface having an inner concave surface the degree of concavity of the said concave surface being greater than degree of convexity of the said convex surface, securing means to secure the said disks together near one edge thereof, said disks being adapted to be independently rotated on the said securing means as an axis.

3. In a mirror device, the combination with a dished mirror disk having a convex reflecting surface, of a protecting disk cover for the said mirror surface having a concave inner surface, the degree of concavity of said concave inner surface being greater than the degree of convexity of the said convex mirror surface, securing means to secure the said disks together near one edge thereof, said disks being adapted to independently rotate on the said securing means as an axis, a back cover disk, and means to non-rotatably secure the said back cover disk to the said mirror disk.

4. In a mirror device, the combination with a dished mirror disk having a convex reflecting surface, of a protecting disk cover for the said mirror surface having a concave inner surface, the degree of concavity of the said inner cover surface being greater than the degree of convexity of the convex mirror surface, securing means to secure the said disks together near one edge thereof, said disks being adapted to independently rotate on the said securing means as an axis, a back cover disk, and means to non-rotatably secure the said back cover disk to the said mirror disk, said last named means comprising the said first named securing means.

5. In a mirror device, the combination with a dished metallic disk having a convex reflecting surface, and a metallic coating of high luster on the convex surface of the said disk, of a protecting disk cover rotatably secured to the said metallic disk near an edge of the said disks, the convex surface of the said metallic disk coöperating with the concave surface of the said cover disk, to frictionally restrain the disk from rotating upon the said securing means as an axis.

6. In a mirror device, the combination with a metallic mirror disk having a convex reflecting surface, of a protecting disk cover for the said mirror surface having a concave inner surface, a non-abrasive coating on the said concave inner surface of the said cover, and securing means to rotatably secure the said disks together near their edges, the said disks being so placed together that the coated concave surface of the said cover lies adjacent to the convex reflecting surface of the said mirror disk.

7. In a mirror device, the combination with a metallic mirror disk having a convex reflecting surface, of a protecting disk cover for the said mirror surface having concave inner surface, a non-abrasive coating on the said concave inner surface of the said cover, and securing means to rotatably secure the said disks together near the edges, the said disks being so placed together that the coating concave surface of the said cover lies adjacent to the convex reflecting surface of the said mirror device; the degree of concavity of the said inner cover surface being greater than the degree of convexity of the said convex mirror surface.

In witness whereof I hereunto subscribe my name this 16 day of August, A. D. 1919.

HARRY O. RUGH.